United States Patent [19]

Marchioro

[11] 4,319,389

[45] Mar. 16, 1982

[54] CONTROLLED DEFLECTION ROLL

[75] Inventor: Ignazio Marchioro, I-Schio, Italy

[73] Assignee: Escher Wyss Limited, Zurich, Switzerland

[21] Appl. No.: 87,091

[22] Filed: Oct. 22, 1979

[30] Foreign Application Priority Data

Nov. 8, 1978 [CH] Switzerland ............... 11469/78

[51] Int. Cl.³ ........................................... B21B 13/02
[52] U.S. Cl. ................................. 29/116 AD; 72/245; 100/162 B; 100/170
[58] Field of Search ................. 29/113 AD, 116 AD; 72/245; 100/162 B, 170

[56] References Cited

U.S. PATENT DOCUMENTS

| 3,885,283 | 5/1975 | Biondetti | 29/116 AD |
|---|---|---|---|
| 3,885,465 | 5/1975 | Bergendahl | 100/170 X |
| 4,023,480 | 5/1977 | Biondetti | 29/113 AD |
| 4,106,405 | 8/1978 | Biondetti et al. | 100/170 X |
| 4,154,160 | 5/1979 | Küsters | 29/113 AD X |
| 4,198,905 | 4/1980 | Lehmann | 100/162 B |
| 4,212,504 | 7/1980 | Kryler et al. | 100/170 X |
| 4,222,324 | 9/1980 | Biondetti | 29/113 AD |

Primary Examiner—Wayne L. Shedd
Attorney, Agent, or Firm—Werner W. Kleeman

[57] ABSTRACT

A controlled deflection roll comprising a stationary roll support and a roll shell rotatable about the roll support. The roll shell is guided in radial direction upon the roll support in order to perform displacement movements, typically lift movements. The controlled deflection roll is equipped with a shutoff element, a slide or a valve, which upon exceeding a given displacement magnitude of the roll shell causes outflow of pressurized fluid medium from a pressure line, and thus, prevents the development of the full pressing or contact force which otherwise could lead to destruction or damage of the roll shell. In an overflow line, branching-off of the pressure line, there can be arranged a residual pressure regulator equipped with valve means or throttle means for preventing drop of the pressure in the pressure line below a desired value.

9 Claims, 5 Drawing Figures

CONTROLLED DEFLECTION ROLL

BACKGROUND OF THE INVENTION

The present invention relates to a new and improved construction of a controlled deflection roll.

Generally speaking, the controlled deflection roll of the present development is of the type comprising a stationary roll support or carrier and a roll shell mounted to be rotatable about the stationary support. This roll shell is movable relative to the roll support in order to perform displacement movements, typically lift or elevational movements. Further, the roll shell is acted upon by at least one pressure or support element, arranged and effective between the roll shell and the roll support, serving for forming a pressure force.

With a controlled deflection roll of this type, as the same has become known in this technology from U.S. Pat. No. 3,885,238, the danger exists that the roll shell will be damaged if the pressure or support elements are effective with their full force when the roll shell, in relation to the roll support, has reached the end of its possible displacement or lift movement. This can happen when the controlled deflection roll is actuated while the roll shell is not supported against a counter roll. This situation can arise, for instance, in the event of faulty assembly of the rolling or roller mill.

SUMMARY OF THE INVENTION

Therefore, with the foregoing in mind it is a primary object of the present invention to provide a new and improved construction of controlled deflection roll which is not afflicted with the aforementioned drawbacks and shortcomings discussed above.

Another and more specific object of the present invention aims at providing a safety device for a controlled deflection roll which when encountering the situations discussed above effectively prevents damage to the controlled deflection roll, especially destruction of its roll shell.

Yet a further significant object of the present invention aims at providing a novel construction of controlled deflection roll which is relatively simple in construction and design, and particularly, is equipped with means which prevents undesired excessive loading of the controlled deflection roll which possibly might cause damage thereto, particularly to the roll shell.

Now in order to implement these and still further objects of the invention, which will become more readily apparent as the description proceeds, the controlled deflection roll of the present development is manifested by the features that a control element is arranged between the roll shell and the stationary roll support. This control element is influenced by the displacement movement of the roll shell and upon exceeding a permissible maximum value of the displacement or lift movement the pressure force exerted by the pressure or support element or elements is effected in the sense of limiting the same to a degree which is inconsequential in terms of possible damage to the roll shell.

In this way there is realized a range throughout which the pressure or support elements can completely develop their applied force. After exceeding this value, before the roll shell has reached the end of its possible displacement or lift movement, the pressure force of the pressure or support element or elements is reduced to a value which is innocuous for the roll shell.

In the case of a controlled deflection roll containing at least one pressure or support element arranged between the stationary roll support and the roll shell, and which pressure element contains at least one pressure chamber or space connected by means of a pressure line with a source of pressurized fluid medium, it is possible to provide a shutoff element which is arranged in the roll support. This shutoff element, upon exceeding a permissible displacement stroke of the roll shell, opens an overflow line or conduit leading from the pressure line or conduit.

With such construction, particularly suitable for hydraulically actuatable controlled deflection rolls, upon exceeding a permissible magnitude of the displacement or lift stroke, the shutoff element opens an overflow line leading to a space of lower pressure, so that the pressure line is load relieved and there can be prevented development of a pressure force by the pressure element or pressure elements which otherwise could lead to damage of the roll shell.

With a preferred embodiment wherein, according to the teachings of U.S. Pat. No. 3,885,283, guide elements are arranged within the ends of the roll shell and upon which there is rotatably mounted the roll shell, these guide elements having parallel guide surfaces movable along coacting parallel guide surfaces of the roll support in the displacement direction of the roll shell, it is possible for the shutoff element to contain a movable shutoff body. This movable shutoff body is sealingly guided in a bore extending within the stationary roll support in the lift or displacement direction of the roll shell. The bore constitutes part of the overflow line or conduit, located at the region of the guide element. One end of the shutoff body coacts with a surface of the guide element. With this preferred constructional arrangement there is afforded the advantage that the movable part of the shutoff element, namely the slide body, while influenced by the roll shell, however is not supported against a movable surface, rather against a stationary surface of the guide element. In this way there is prevented wear which otherwise would be present if the shutoff element were to coact with the inner surface of the roll shell.

The shutoff element can be constituted by a slide arrangement having a slide body which is sealingly guided in a bore within the stationary roll support and, during operation, is pressed under the action of the hydraulic pressure effective in the overflow line, against the surface of the guide element. However, the shutoff element also can be constituted by a valve having a valve body, which part, upon attaining the maximum permissible displacement or stroke, is lifted from its valve seat by the coacting surface of the guide element. In both cases the objectives of the invention of providing a foolproof safety device for precluding damage to the controlled deflection roll under the described conditions can be realized with the use of extremely simple means.

The overflow line or conduit with the bore can be connected at a distributor bore for the pressurized fluid medium, the distributor bore being formed in the stationary roll support. This particularly simple construction is suitable, for instance, in those instances where all of the pressure or support elements of the controlled deflection roll are connected at a line or conduit carrying the same pressure.

However, the bore also can be connected at an overflow line or conduit branching-off from the pressure line or conduit. This construction is suitable for controlled deflection rolls utilizing a number of groups of pressure or support elements, each pressure element group being fed by pressurized fluid medium at different pressures.

Moreover, in the overflow line there can be arranged a shutoff element activated by a regulator. The regulator prevents dropping of the pressure in the pressure line below a predetermined permissible value. With a simpler construction it is possible, for the same purpose, to arrange a throttle location in the overflow line or conduit. In both cases there is formed a residual pressure or force of the pressure or support elements which, for instance, is desired upon carrying out adjustment work or adjustment settings at the machine, typically the rolling mill.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
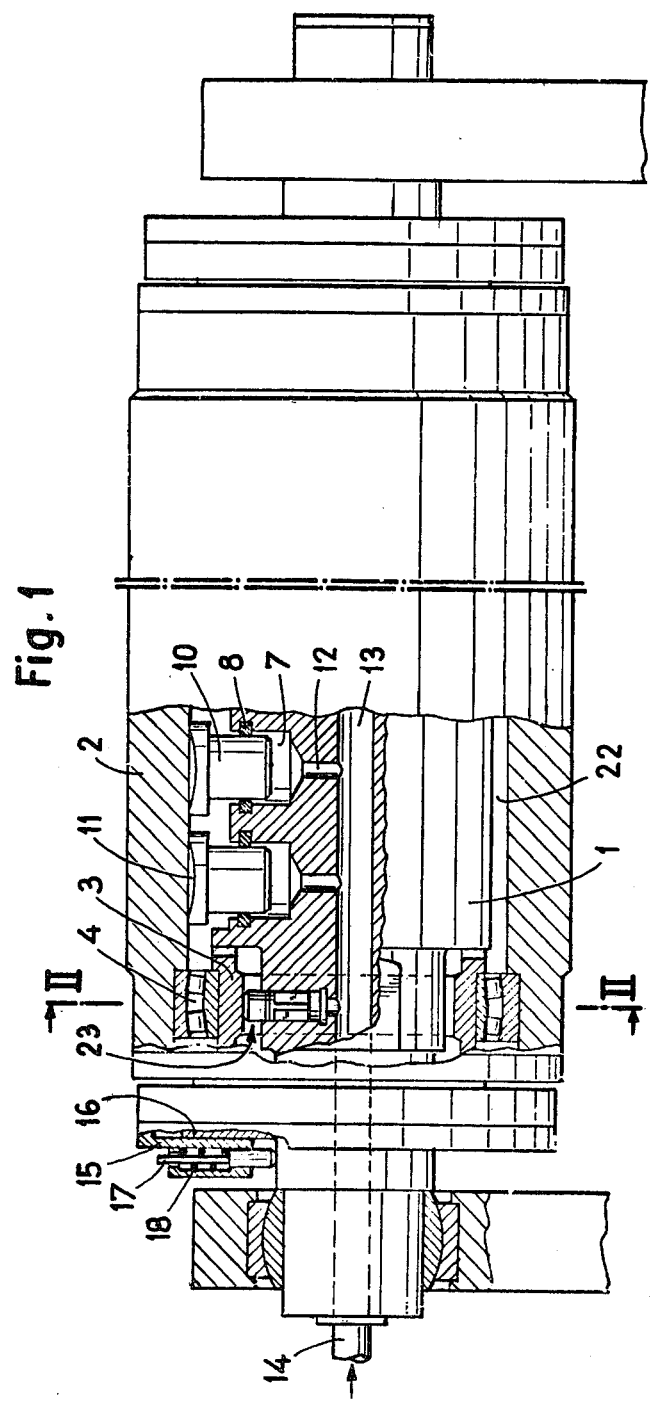
FIG. 1 is a fragmentary sectional view of a controlled deflection roll constructed according to the invention.

Describing now the drawings, in FIG. 1 there is shown an exemplary embodiment of controlled deflection roll which will be seen to comprise a stationary roll support 1 and a roll shell 2 which is mounted to be rotatable about such stationary roll support or carrier 1. The roll shell 2 is rotatably mounted at its ends upon guide elements 3 with the aid of roller bearings 4 or any other suitable anti-friction bearing means.

Figure 2:
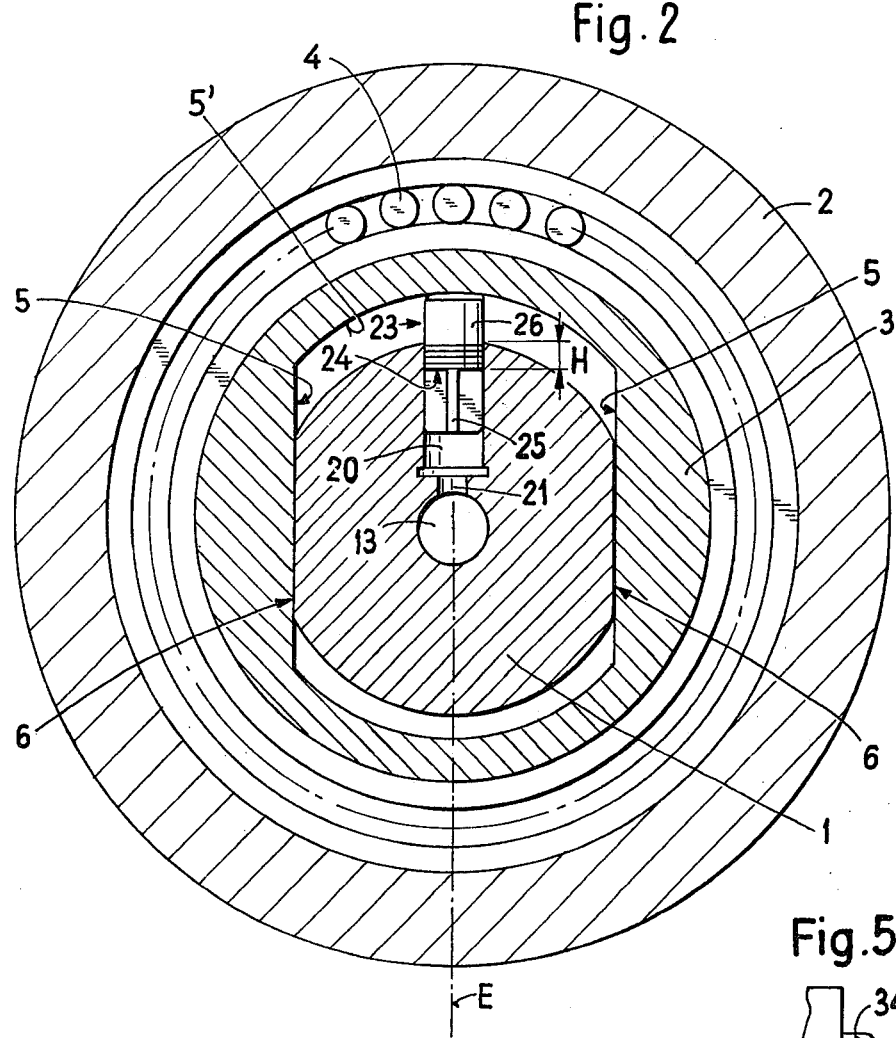
FIG. 2 is a cross-sectional view of the controlled deflection roll shown in FIG. 1, taken substantially along the line II—II thereof.

As best seen by referring to FIG. 2, each guide element 3 is provided with essentially parallel, mutually confronting guide surfaces 5 which are guided along likewise parallel mutually confronting guide surfaces 6 which are formed at the roll support 1. Such type construction of controlled deflection roll which enables displacement or lift-off movements of the roll shell 2 in a contact or press plane E, extending parallel to the surfaces 5 and 6, is known from the aforementioned U.S. Pat. No. 3,885,283.

Furthermore, there are formed at the stationary roll support 1 mutually parallel cylindrical bores 7, the axes of which are located in the press plane E. There are guided in the cylindrical bores 7, within the seals 8, hydrostatic pressure or support elements 10, here shown in the form of contact pistons. These piston-like pressure or support elements 10 can be provided, in the manner taught for instance in U.S. Pat. No. 3,802,044, with a hydrostatic bearing between their slide or contact surfaces 11 and the roll shell 2. However, it is also possible to use a hydrodynamic bearing or support arrangement, for instance of the type disclosed in U.S. Pat. No. 3,119,324.

As further seen by referring to FIG. 1, the cylindrical bores 7 are connected by means of connection bores 12 at a common distributor bore 13 provided in the stationary roll support 1. The distributor bore 13 is connected, in turn, by means of a pipe conduit or line 14 at a not particularly illustrated but conventional source of pressurized fluid medium, shown symbolically in FIG. 1 by the arrow appearing at the left-hand side of such drawing.

As also will be seen by reverting to FIG. 1, at the end of the guide element 3 there is arranged a closure portion or member 15 in which there is sealingly guided a closure plate 16 which obturates the end of the roll support 1. Additionally, an indicator, for instance in the form of a pin 17 is guided in the closure element 15 for movement in the direction of the press or contact plane E. This pin 17 is pressed by the action of a spring 18 against the roll support 1. At the closure element 15 there can be arranged a not particularly shown scale which coacts with the pin 17, by means of which it is possible to read-off, based upon the position of the pin 17, the location of the roll shell 2 in relation to the roll support 1.

Turning attention now to FIG. 2, there will be seen that, according to the invention, there is formed at the roll support 1, at the region of the illustrated guide element 3 a slide bore 20 constituting part of an overflow line or conduit 21. This overflow line or conduit 21 leads from the distributor bore 13 and opens into an intermediate space or chamber 22 between the roll shell 2 and the roll support 1. Sealingly guided within the slide bore 20 is a slide body or slide 23 having a control edge 24. Below the control edge 24 the slide body or slide 23 is provided, in known manner, with a cross-shaped cross-sectional configuration having ribs 25 which also then provide a guiding action within the cylinder bore 20 even if the cylindrical part 26 of the slide body 23 has shifted out of the cylinder bore 20. The slide body or slide 23, during operation, is pressed by the pressure which is effective in the slide bore 20 against the upper domed surface 5' of the guide element 3, and thus, follows the movement of the guide element 3 and the roll shell 2 in relation to the roll support 1.

As further recognized by the showing of FIG. 2, as soon as there has been exceeded a permissible height H of the displacement stroke or lift movement of the roll shell 2 in relation to the roll support 1, the control edge 24 upwardly opens, in the showing of FIG. 2, the cylinder bore 20. As a result, there is possible an outflow of the pressurized fluid medium from the distributor bore 13. Hence, the bore 13 is no longer under pressure, so that there is no longer possible the exertion of a pressure or force upon the pressure or support elements 10. Hence, the roll shell 2 cannot become damaged by the action of forces which are effective thereat which, for instance, would be the case if, upon exceeding the permissible lift or displacement stroke H the roll support 1 would impact against the lower end of the guide element 3 of the showing of FIG. 2, with the result that the pressure forces of the pressure or support elements 10 would be further effective.

Figure 3:
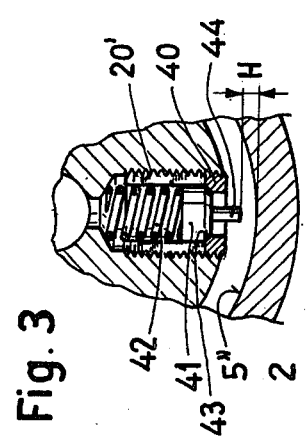
FIG. 3 is a fragmentary sectional view of part of the arrangement of FIG. 2 illustrating another embodiment of shutoff element according to the invention.

FIG. 3 illustrates another embodiment of shutoff element in the form of a sectional detail of the arrangement of FIG. 2. According to the showing of FIG. 3, wherein the same elements have been designated with the same reference characters as employed in the showing of FIG. 2, there is threaded into a threaded bore 20', essentially corresponding to the bore 20, but directed in the opposite direction a threaded bushing or sleeve 40 provided with a valve seat 43. Guided within the threaded bushing or sleeve 40 is a valve body 41 which is pressed by the action of a valve spring 42 against the valve seat 43. The valve body 41 is provided with a projection 44 which, in the illustrated position, is located at a spacing H from the oppositely situated surface of the guide element 3.

The mode of operation of the shutoff element according to the showing of FIG. 3 is the same as for the slide of FIG. 2. When the roll shell 2, together with the guide element 3, moves upwardly through the distance H of the showing of FIG. 3, then the projection 44 impacts against the lower domed surface 5" of the guide element 3, with the result that the valve body 41 is raised from its seat 43. Hence, the pressurized fluid medium, typically preferably pressurized oil, can flow out of the bore 13.

Figure 4:
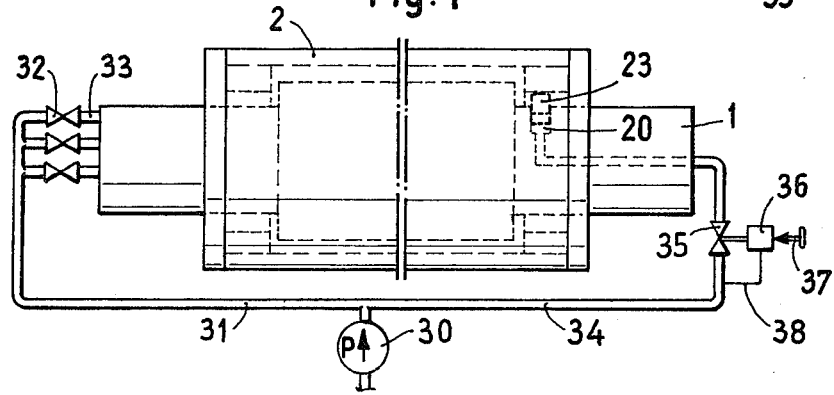
FIG. 4 schematically illustrates a controlled deflection roll with the fluid medium circuit and the controlled deflection roll utilizing a number of groups of pressure or support elements which are each under the influence of different pressures.

FIG. 4 shows a hydraulic circuit arrangement in conjunction with a controlled deflection roll according to the invention in an environment where, such controlled deflection roll for instance is provided, as taught in U.S. Pat. No. 4,047,273 with groups of pressure or support elements exposed to different pressures.

According to the showing of FIG. 4 the schematically illustrated controlled deflection roll likewise has a roll support or carrier 1 and a rotatable roll shell 2. The slide piston or slide 23, which can be designed in the manner of the corresponding slide structure of FIGS. 1 and 2, is likewise only schematically illustrated.

With the embodiment of FIG. 4 the source of pressurized fluid medium, indicated generally by reference character 100, contains a pump 30 with controllable pressure and equipped with a pressure line or conduit 31. Branched-off of the pressure line 31, by means of the pressure regulators 32, are the branch lines or conduits 33 leading to the individual groups of the not further shown pressure or support elements of known design as mentioned above. In this case, a branch line 34 leads from the pressure line or conduit 31 to the slide arrangement containing the slide bore 20 and the slide body 23. A regulator 36 having a reference or set value 37 and a measuring line 38, actuating a valve 35, prevents dropping of the pressure in the line 31 below a given value.

Figure 5:
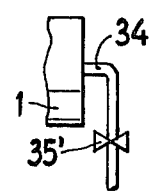
FIG. 5 is a fragmentary detail showing of a modified portion of the arrangement of FIG. 4 according to another teaching of the invention.

With the embodiment of FIG. 5 the valve 35 together with the regulator 36 has been replaced by a throttle element or throttle means 35'. The throttle element 35' prevents, in analogous fashion, upon opening of the slide arrangement 20, 23, dropping of the pressure in the line or conduit 31 below the predetermined desired value.

It should be understood that the illustrated controlled deflection roll is provided with a device for the withdrawal of the hydraulic medium which flows in the intermediate space or chamber 22. This withdrawal device can be of the type disclosed in U.S. Pat. No. 4,048,709 to which reference may be readily had and the disclosure of which is incorporated herein by reference.

Although the invention has been explained on the basis of a controlled deflection roll having a number of hydrostatic pressure or support elements, it would be possible to also provide a single, for instance substantially ledge-shaped pressure or support element. The mounting of the roll shell upon the pressure or support element or elements can also be accomplished hydrostatically, as taught in U.S. Pat. No. 3,802,044, or also only hydrodynamically.

It is however to be understood that the principles of the invention can be utilized in the same manner with other controlled deflection rolls which are not only hydraulically actuated.

While there are shown and described present preferred embodiments of the invention, it is to be distinctly understood that the invention is not limited thereto, but may be otherwise variously embodied and practiced within the scope of the following claims.

ACCORDINGLY,

What I claim is:

1. A controlled deflection roll comprising:
   a stationary roll support;
   a roll shell rotatable about said stationary roll support;
   means for mounting said roll shell for rotation about said stationary roll support and for movement relative to said stationary roll support in order to carry out displacement motions;
   at least one pressure element for forming a pressure force effective at the roll shell;
   said pressure element being arranged between the roll shell and the stationary roll support;
   control means arranged between the roll shell and the stationary roll support;
   said control means being influenced by the displacement movement of the roll shell and upon exceeding a permissible maximum value of the displacement movement effecting the pressure force exerted by the pressure element at the roll shell such that such pressure force is limited to a degree which does not endanger the roll shell.

2. The controlled deflection roll as defined in claim 1, wherein:
   said at least one pressure element contains at least one pressure chamber;
   a source of pressurized fluid medium;
   a pressure line connecting the pressure chamber with said source of pressurized fluid medium;
   said control means comprising a shutoff element; an overflow line;
   said overflow line leading from the pressure line into a space at lower pressure; and
   said shutoff element opening the overflow line upon exceeding a permissible magnitude of the displacement movement.

3. The controlled deflection roll as defined in claim 2, wherein:
   said means for mounting said roll shell for displacement movements comprises guide elements arranged within the ends of the roll shell and upon which the roll shell is rotatably mounted;
   said guide elements containing essentially parallel guide surfaces;
   said stationary roll support having essentially parallel guide surfaces along which said parallel guide surfaces of said guide elements are movable in the displacement direction of the roll shell;
   said shutoff element comprising a movable shutoff body sealingly arranged in a bore extending in the stationary roll support in the displacement direction of the roll shell;

said bore constituting part of said overflow line located at the region of the guide element; and one end of said shutoff body coacting with a surface of the guide element.

4. The controlled deflection roll as defined in claim 3, wherein:

said shutoff element comprises slide means having a slide body sealingly guided in a bore of the stationary roll support;

said slide body, during operation of the controlled deflection roll, being exposed to the effect of the hydraulic pressure effective in the overflow line and being pressed against the surface of the guide element.

5. The controlled deflection roll as defined in claim 3, wherein:

said shutoff element comprises valve means having a valve body;

said valve body having a portion which, upon reaching the greatest permissible displacement stroke of the roll shell, is lifted from a valve seat by the coacting surface of the guide element.

6. The controlled deflection roll as defined in claim 3, further including:

distributor bore means formed at the stationary roll support and serving for the distribution of the pressurized fluid medium; and said overflow line together with said bore being connected with said distributor bore means.

7. The controlled deflection roll as defined in claim 3, wherein:

said overflow line branches off of the pressure line; and said bore being connected with said overflow line.

8. The controlled deflection roll as defined in claim 2, wherein:

said control means further comprises a regulator actuating said shutoff element and arranged in the overflow line; and said regulator preventing dropping of the pressure in the pressure line below a predetermined permissible value.

9. The controlled deflection roll as defined in claim 2, further including:

throttle means arranged at the overflow line for preventing dropping of the pressure in the pressure line below a predetermined permissible value.

* * * * *